UNITED STATES PATENT OFFICE.

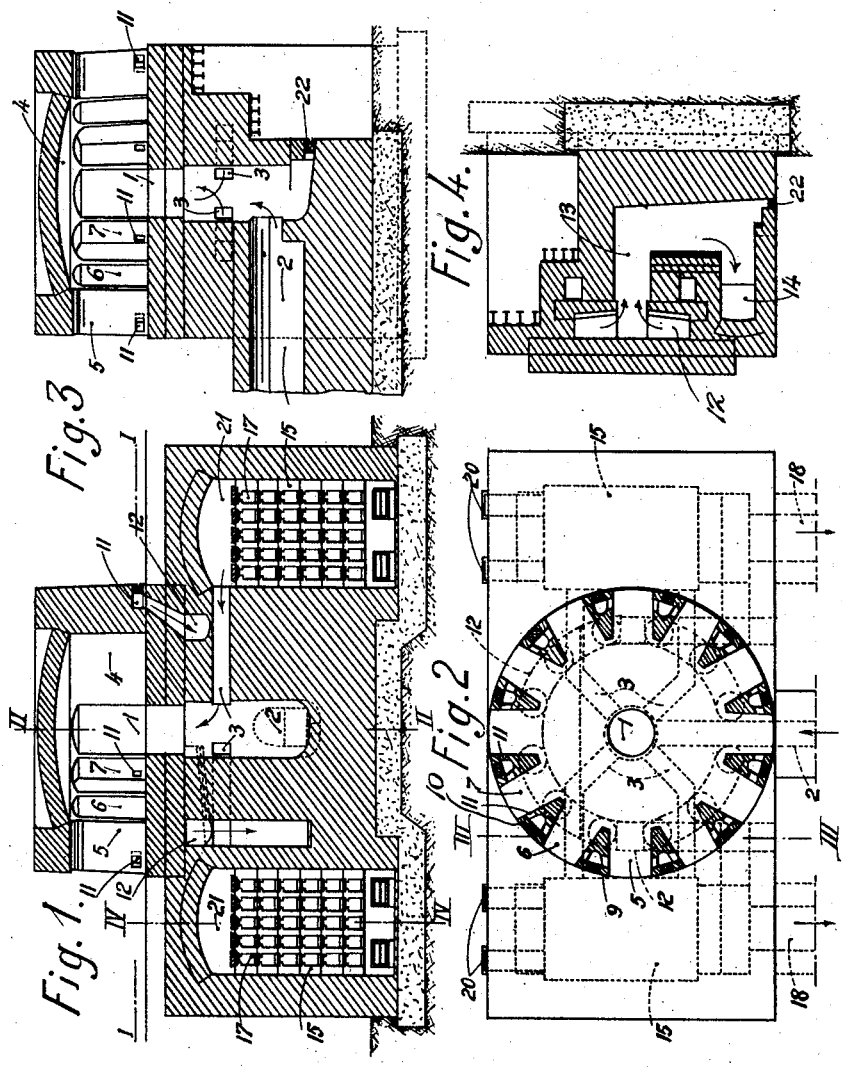

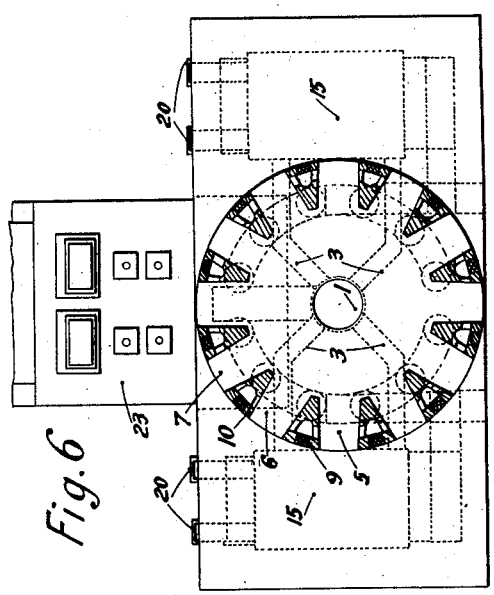
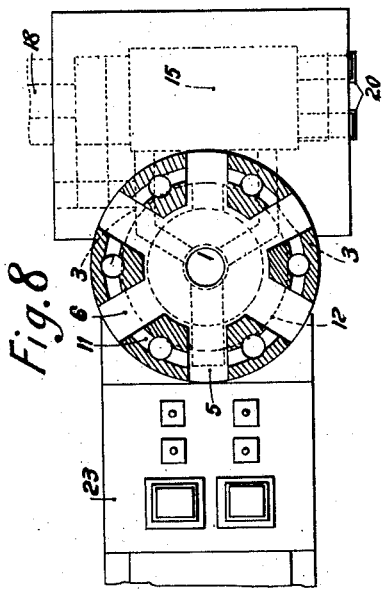
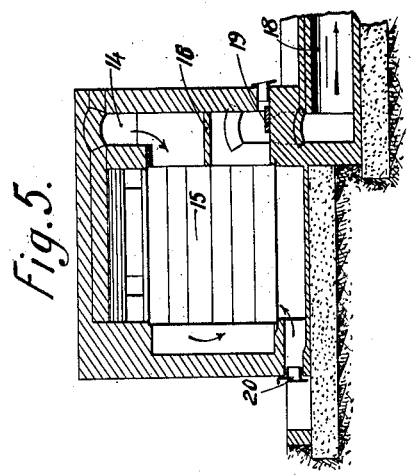
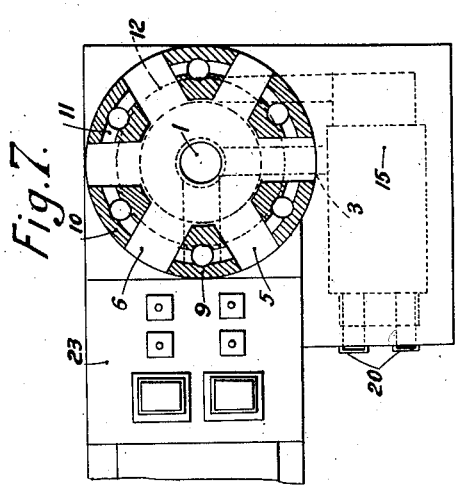

CHARLES M. STEIN, OF PARIS, FRANCE, ASSIGNOR TO SOCIETE ANONYME DES APPAREILS DE MANUTENTION ET FOURS STEIN, OF PARIS, FRANCE, A CORPORATION OF FRANCE.

CRUCIBLE SMELTING-FURNACE.

1,365,204.        Specification of Letters Patent.        Patented Jan. 11, 1921.

Application filed May 21, 1919. Serial No. 298,818.

*To all whom it may concern:*

Be it known that I, CHARLES M. STEIN, citizen of the French Republic, residing at Paris, Department of the Seine, in France, and whose post-office address is 31 Boulevard Péreire, in the said city, have invented certain new and useful Improvements in or Relating to Crucible Smelting-Furnaces; and I do hereby declare the following to be a full, clear, and exact description of the invention, such as will enable others skilled in the art to which it appertains to make and use the same.

This invention has for its object a crucible furnace with or without covers or lids and particularly suited for the melting of glass or crystal.

This furnace is heated by a central burner opening into the floor of the crucible chamber and is provided with regenerators for the secondary air which supports combustion.

The flames after having filled the crucible chamber, descend through the openings in the bases of the columns to the annular collectors which conduct them to regenerators placed outside the walls of the crucible chamber.

These regenerators are traversed on the other hand by the air coming in from outside which is reheated and then enters the central burner where it serves as secondary air to support combustion.

The central burner, and in like manner the flues are arranged in glass pits which allow the glass to run away outside the walls of the furnace so as to avoid the choking up of the passages by the glass escaping from the crucibles if these are cracked or broken.

The accompanying drawings show by way of example different forms of construction of the furnace according to this invention.

Figure 1 is a vertical section of one form of construction of this furnace.

Fig. 2 is a horizontal section on the line I—I of Fig. 1.

Fig. 3 is a vertical section on the line II—II of Fig. 1.

Fig. 4 is a vertical section on the line III—III of Fig. 2.

Fig. 5 is a vertical section on the line IV—IV of Fig. 1.

Fig. 6 is a horizontal section similar to Fig. 2 of a furnace with a gas generator alongside of it.

Fig. 7 is a horizontal section of a furnace with a gas generator and a regenerator.

Fig. 8 is a modification of Fig. 7 wherein the hot air is delivered to the burner by two passages in place of a single one.

A gas generator, of the ordinary construction, not shown in Fig. 1, delivers the gas to the central burner 1 through the flue 2. The hot air, coming from the regenerators in a manner to be hereinafter described which burns the gas is delivered to the central burner 1 through the crossed flues 3. The flames then pass into the crucible chamber 4 through the hole in the central burner 1. This crucible chamber is formed of vaulted arches 5, 6, 7, etc., resting upon the central pillars 9, 10, etc. Each arch takes a melting pot of the ordinary type (not shown) and with or without a cover or lid.

The flames, after having heated up the crucibles, leave the crucible chamber 4 through the holes 11 in the pillars or in the floor itself in front of each crucible and reach the circular flues 12 whence they pass by the passages 13 and 14 to the regenerator 15 (see Figs. 4 and 5). They traverse these latter horizontally turning back one or more times owing to horizontal partitions or baffles 16; they heat up the regenerating elements composed of hollow earthenware 17 of the usual type and then pass to the flues 18, by means of dampers 19 and thence to the chimney.

The air which has to be supplied to the passages 3, to burn the gas in the central hole 1, is admitted to the regenerators 15 through the grids 20. It becomes heated up by passing through the vertical holes of the hollow earthenware 17 of the regenerators 15 and is delivered to the passages through the hot air chambers 21.

To prevent the choking up of the passages by the glass which may escape from cracked or broken pots the base of the central burner and of the return flues of the arches 6 and 7 by way of passage 13, are arranged in glass pits which are provided with plugs 22 (see Figs. 3 and 4) and permit the glass to run away outside the walls of the furnace.

Fig. 6 represents a furnace of the same construction but with a gas generator 23 of any ordinary known type along side of it.

Fig. 7 represents a furnace for a lesser number of pots with a single regenerator in place of two and a gas generator combined therewith, the hot air being delivered to the burner by a single passage from the circular flue 12.

Fig. 8 represents a modification of this latter furnace in which the hot air is delivered to the burner by two passages 3 in place of a single one.

It is to be understood that the invention is not limited to the furnaces shown, the number of arcades may be increased or diminished at will, just as may also the arrangement of the flues and the details of construction.

I claim:

1. A crucible smelting furnace particularly intended for the melting of glass or crystal, having a central gas burner, a crucible chamber arranged centrally above said burner comprising a series of uniformly spaced hollow arches, a regenerator for heating the air supplied to the burner, flues connecting said regenerator with the hollow arches, and flue openings carried by each arch, opening into the arch flues for establishing a return circuit for the hot flames and gases entering the crucible chamber.

2. A crucible smelting furnace particularly intended for the melting of glass or crystal, having a central gas burner, a crucible chamber arranged centrally above said burner having a stationary floor and roof portion, hollow tiers uniformly spaced connecting the floor with said roof, forming a series of arches, a circular flue arranged beneath said floor, regenerators for heating the air supplied to the burner, flues connecting said regenerators with the hollow arches by way of the circular flue, and flue openings carried by each arch opening into the arch flues for establishing a return circuit for the hot flames and gases entering the crucible chamber.

3. A crucible smelting furnace particularly intended for the melting of glass or crystal, comprising a crucible chamber, a central chamber having a gas burner working with the secondary air supplied from the regenerators heated by the flames from the burner, conducted thereto by return flues from the crucible chamber, said central gas burner chamber and return flues being provided with glass pits or traps for the purpose of collecting and drawing off any overflow that might happen to pass into said opening or passageways during the operation of the burner.

In testimony whereof I affix my signature in presence of a witness.

CHARLES M. STEIN.

Witness:
CHAS. P. PRESSLY.